United States Patent [19]

Marek

[11] 4,253,628
[45] Mar. 3, 1981

[54] AUTOMATIC PARACHUTE RELEASE SYSTEM

[75] Inventor: Albert J. Marek, Dallas, Tex.

[73] Assignee: The United States of America as represented by the Secretary of the Navy, Washington, D.C.

[21] Appl. No.: 91,224

[22] Filed: Nov. 6, 1979

[51] Int. Cl.³ .............................................. B64D 17/30
[52] U.S. Cl. ............................ 244/151 A; 244/151 B
[58] Field of Search ...................... 244/151 A, 151 B; 9/317, 318, 9; 102/16, 28 R, 28 P; 200/61.04, 61.05, 61.06; 361/330

[56] References Cited

U.S. PATENT DOCUMENTS

| 3,545,271 | 12/1970 | Amir et al. ...................... 361/330 X |
| 3,602,661 | 8/1971 | Liedberg ............................ 200/61.05 |
| 3,722,408 | 3/1973 | Fox et al. ....................... 200/61.05 X |
| 3,922,762 | 12/1975 | Turner et al. ................ 244/151 A X |
| 4,024,440 | 5/1977 | Miller ................................... 9/318 X |

Primary Examiner—Trygve M. Blix
Assistant Examiner—Reinhard J. Eisenzopf
Attorney, Agent, or Firm—R. S. Sciascia; P. C. Lall

[57] ABSTRACT

A parachute release arrangement which is mounted on the parachute buckle utilizes a pair of water sensors that are activated when they are immersed in sea water. Activation of one sensor results in the connection of a battery to a DC-to-DC converter which raises the battery voltage to a substantially higher level for charging a storage capacitor. If the other sensor is also activated, this storage capacitor is subsequently discharged through an electrical explosive device when the voltage across it reaches a predetermined value. The resultant explosive force disengages a release lever in the buckle from the parachute strap and allows the detachment of the parachute. A checkout circuit is provided for monitoring the standby status of the control circuit.

10 Claims, 3 Drawing Figures

AUTOMATIC PARACHUTE RELEASE SYSTEM

The present invention relates generally to a water-activated parachute release system and, more particularly, to a control circuit which automatically activates the release mechanism when the parachute harness buckle is immersed in a fluid medium that has a specified conductivity.

There are available in the prior art arrangements which automatically release a parachute from the wearer when a water sensing circuit is activated. One technique employed for extending the shelf life of the power supply used in the apparatus involves charging a storage capacitor to a level sufficient to detonate an electronic explosive device which provides the force for operating the parachute canopy release mechanism. However, only a single water sensor controls the charging operation, and consequently, accidental activation of the release mechanism may occur as a result of the sensor reacting to high humidity, rain or salt spray. Also, there is the possibility that firing of the electrical explosive device may take place because of irradiation of the control circuit by high intensity electromagnetic energy.

It is also desirable that the automatic parachute release system be provided with a checkout circuit since these systems will normally have to remain in a standby status for long periods of time prior to their utilization. Thus, for example, the battery which provides the power source may have deterioration to the point where it cannot effectively charge the storage capacitor to a level sufficient to fire the electrical explosive device when the need arises. To safeguard against this, the condition of the firing circuit should be periodically monitored.

It is accordingly, an object of the present invention to provide an automatic parachute release system wherein the inadvertent operation of a single water sensor will not cause its activation.

Another object of the present invention is to provide a control circuit for activating a parachute release mechanism which will not respond to rain, salt spray, or high humidity.

Another object of the present invention is to provide a control circuit for a parachute release mechanism which is of miniature construction and small enough to be mounted on a harness buckle.

Another object of the present invention is to provide a control circuit for a parachute release system which contains a checkout feature that monitors the operational status of the critical components of the circuit.

Briefly, and in general terms, the above objects are obtained by utilizing a pair of water sensors in the control circuit, with one of the sensors operating a first switch which connects a primary battery to an energy transfer arrangement that provides the charging voltage for a storage capacitor. This transfer device is a DC-to-DC converter which steps up the battery voltage to a level sufficiently high to permit the storage capacitor to supply approximately 50 millijoules of energy to the electrical explosive device and still have this capacitor of comparatively small volume. The second water sensor arms a second power switch which closes only when the storage capacitor is charged to a specified value. When this power switch is activated, the charged storage capacitor fires an electrical explosive device which drives a mechanical actuator which in turn releases a locking mechanism within the harness buckle assembly. Thus, both water sensors must be immersed in a fluid medium having the proper conductivity for the release system to function. As a further safety provision, the electrical explosive device has both of its terminals normally grounded and, consequently, it is short circuited in its standby condition. Hence there is little likelihood of it being prematurely fired by electromagnetic energy which is irradiating the apparatus and producing unwanted circulating currents in the control circuit.

Other objects, advantages and novel features of the invention will become apparent from the following detailed description of the invention when considered in conjunction with the accompanying drawings wherein.

Figures 1, 2:
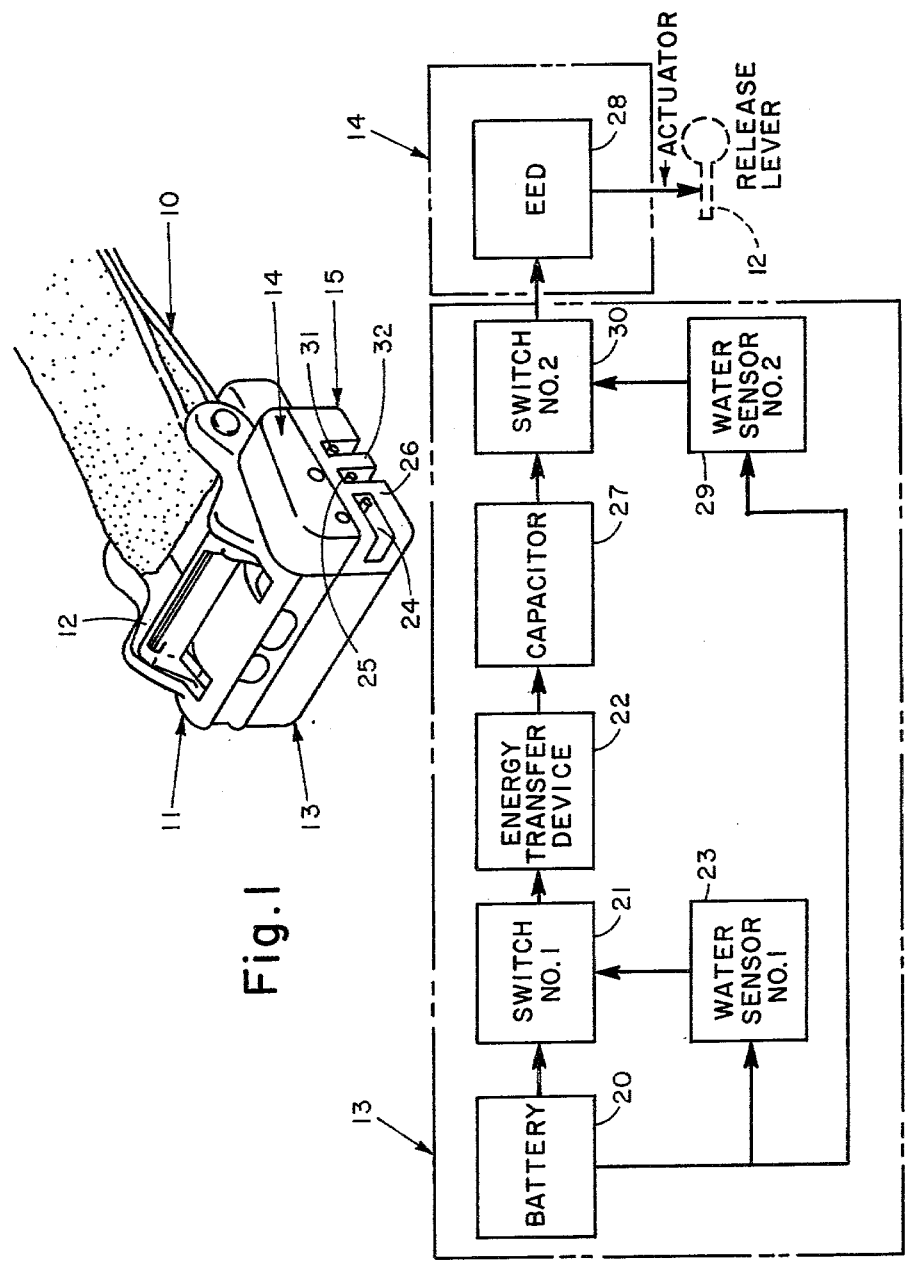
FIG. 1 illustrates the general arrangement of the various subassemblies connected to the parachute buckle, including the electronic package, the water sensors, and the pyrotechnic actuator.
FIG. 2 is a box diagram showing the various components comprising the electronic package assembly.

Referring now to FIG. 1, one strap of a parachute harness 10 is connected to a buckle 11 which includes a release lever 12. In one position this release lever locks the parachute harness to its wearer and when rotated therefrom to a second position, allows this attachment to be broken. Secured to the buckle 11 is an electronic package assembly 13, a pyrotechnic actuator assembly 14 and a water sensor assembly 15.

The electronic package assembly as shown in FIG. 2 includes a primary battery 20 which is connected by a first power switch 21 to an energy transfer device 22. This connection is established when a first water sensor 23 is activated in response to the immersion of the harness buckle into a fluid medium having the proper conductivity.

As seen in FIG. 1 sensor 23 consists of a pair of spaced electrodes 24 and 25 which have an insulating wall 26 interposed therebetween. When the sensor assembly 15 is immersed in sea water, for example, a low resistance conducting path will be established between these electrodes. Any rain or salt spray present in their vicinity, however, will not establish such a path because of the barrier formed by wall 26.

Energy transfer device 22 is coupled to a storage capacitor 27 and, consequently, this capacitor is charged whenever water sensor 23 is activated. Capacitor 27, however, can only be discharged and the electronic explosive device 28 accommodated in the pyrotechnic actuator assembly 14 fired when water sensor 29 operates to close a second power switch 30. The firing of the electronic explosive device 28 results in the displacement of a release lever 12 which frees the pilot from the parachute apparatus he is wearing. As mentioned hereinbefore, the system thus requires that both water sensors 23 and 29 be activated before the EED is fired.

The second water sensor consists of electrode 25 and a third electrode 31 spaced therefrom with a second insulating barrier wall 32 interposed therebetween. Electrode 25, it will be appreciated, is a common component of both water sensors.

Figure 3:
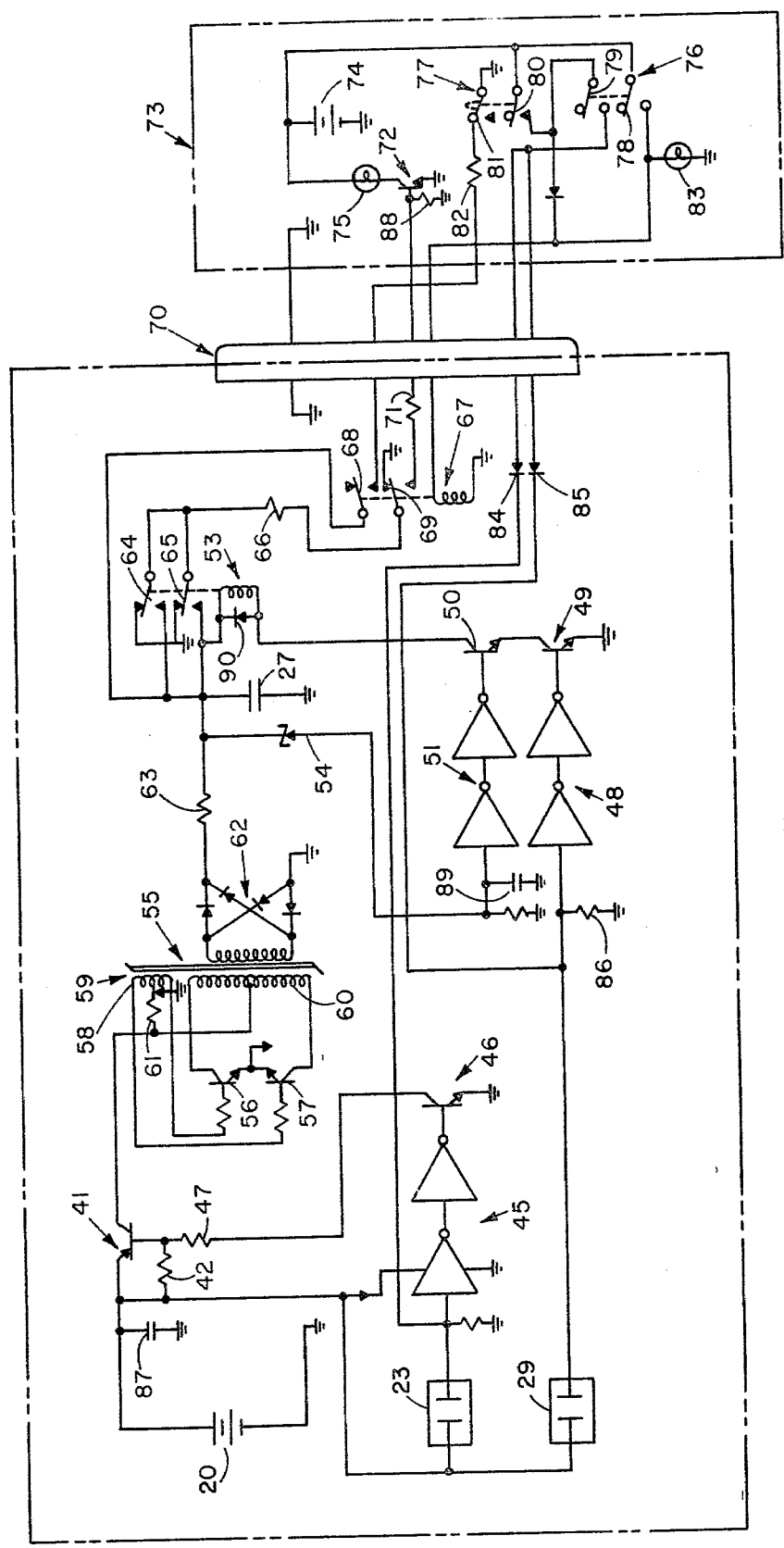
FIG. 3 is a schematic diagram of the electrical package assembly including the checkout circuit.

Referring now to FIG. 3 which is a schematic diagram of the electronic package for firing the electrical explosive device and the checkout circuit for monitoring its standby condition, the main power supply battery 20 of 5.6 volts has its negative terminal grounded and its positive terminal connected both to the emitter of transistor 41, whose base is connected to this same electrode by resistor 42, and to one electrode of each water sensors 23 and 29. Transistor 41 performs as the first power switch previously mentioned. The two electrodes just mentioned may in fact be the common electrode 25 previously identified. The other electrode of sensor 23 is coupled to the input of a Schmitt trigger 45, the output of which is coupled to the base electrode of transistor 46 which has its emitter grounded and its collector coupled to the base of transistor 41 by resistor 47. The other electrode of a water sensor 29 is coupled to the input of a second Schmitt trigger 48 and the output of this trigger is supplied to the base electrode of transistor 49 which has its emitter grounded and its collector coupled to the emitter of a series transistor 50. Transistor 50 has its base coupled to the output of a third Schmitt trigger 51 whose operation, as will be seen hereinafter, is controlled in accordance with the voltage level occuring across storage capacitor 27.

The control winding of relay 53, the second power switch previously mentioned, is connected between the ungrounded side of storage capacitor 52 and the collector electrode of series transistor 50. Also connected to this same side of the storage capacitor is the cathode of a Zener diode 54, the anode of which is connected to the input circuit of the Schmitt trigger 51.

A DC-to-DC converter generally represented by reference character 55 is connected between the collector electrode of switching transistor 41 and the ungrounded side of storage capacitor 27. This converter, whose purpose in the circuit is to step up the battery voltage from 5.6 volts to 56 volts is of conventional design and includes a pair of transistors 56 and 57 having their base electrodes connected to opposite ends of a primary winding 58 of transformer 59. The emitter of these transistors are grounded and their collectors are connected to opposite ends of a second primary winding 60, the center tap of which is connected to the collector electrode of transistor 41. The center tap of winding 58 is also connected to this collector through a resistor 61. The secondary winding of transformer 59 has a rectifying bridge 62 connected across it and the DC voltage resulting from this rectification is coupled via a resistor 63 to the ungrounded side of storage capacitor 27.

Relay 53 has a pair of contact arms 64 and 65 which move together between an upper position corresponding to the unenergized condition of its control winding at which they effectively ground one side of the electronic explosive device 66 and a lower position, at which they connect this same side of the explosive device to the ungrounded side of storage capacitor 27.

A second relay 67, used in the checkout procedure, also has a pair of interconnected contact arms 68 and 69. When relay 67 is de-energized, these contact arms are in their upper position and in this position the lower contact arm 69 grounds the other side of the explosive device 66, while the upper contact arm is ineffective. It will thus be seen that in its standby condition both terminals of the EED 66 are grounded. In its alternative position, lower contact arm 69 connects this other side of the EED to the base of transistor 72 in the checkout circuit through a series current limiting resistor 71 and via appropriate interconnections in an electrical connector 70. In its alternate position, contact arm 68 of relay 67 connects the ungrounded side of storage capacitor 27 to ground through a resistor 82, thus providing a discharge path for the capacitor. This connector, which may be mounted in one of the exposed side walls of the electronic package assembly 13 in FIG. 1, provides a convenient means for interconnecting the testing circuit generally represented by reference character 73 to the control circuit 13.

Test circuit 73 includes a battery 74 of 5.6 volts which has its negative terminal grounded and its positive terminal connected to one side of a first indicator light 75, the other side of which is connected to the collector electrode of transistor 72 whose emitter is grounded. The positive terminal of battery 74 is also connected to one contact arm 78 of a two position switch 76 and to one contact arm 80 of a second two position switch 77. Both of these switches are manually operated.

When switch 76 is in its "off" position, both contact arms are in their upper position as seen in this figure and are ineffective. However, when this switch is in an "on" condition with both contact arms in their lower position, a second indicator light 83 is energized and power is supplied to the operating winding of relay 67. Also contact arm 79 of switch 76 connects the lower terminal of switch 77 that makes contact with arm 80 to the input circuit of Schmitt triggers 45 and 48 through diodes 84 and 85 respectively.

The operation of the control circuit of FIG. 3 is as follows: When the parachute buckle 11 is immersed in sea water, a low resistance conducting path is established between electrodes 24, 25 and 31 of the two water sensors 23 and 29 and a positive voltage from battery 20 appears at the input of Schmitt trigger 48. If this voltage exceeds a predetermined threshold value established by resistor 86, a logical "1" signal is produced at the output of this trigger and supplied to the base electrode of transistor 49, causing this transistor to switch to an "on" condition and arming relay 53. This relay, as mentioned hereinbefore, correspond to the second power switch shown in FIG. 2. The presence of resistor 86 not only insures that the Schmitt trigger 48 remains in an "off" status when sensor 29 is not immersed in sea water, but additionally it provides a high degree of immunity from electromagnetic interference.

With sensor 23 also activated, Schmitt trigger 45 operates like its counterpart 48 to switch transistor 46 "on". With transistor 46 "on" transistor 41, the other power switch of FIG. 2, is now biased to conduction and an input voltage from battery 20 is now supplied to the DC-to-DC converter 55.

It would be pointed out that the battery voltage of 5.6 volts is stepped up to 56 volts by the converter. Capacitor 87 which is connected between the emitter electrode of transistor 41 and ground suppresses any voltage transients generated by the converter. Also resistor 63 which is connected between the rectifying bridge 62 and storage capacitor 27 prevents overloading of the converter and battery 20.

The DC output from the rectifying bridge 62 now charges storage capacitor 27 and the voltage across this capacitor is monitored by Zener diode 54. When it exceeds the Zener breakdown value of diode 54, a condition which prevails when the voltage across the capacitor reaches approximately 26 volts, an input voltage is supplied to the Schmitt trigger 51 and, as a consequence, series transistor 50 is turned "on" in a manner similar to transistor 49. With both transistors 49 and 50 now "on", relay 53 is energized and contact arms 64 and 65 move to their lower position, completing a discharge path for the charged capacitor 27 to ground through the electronic explosive device 66 and the upper contact arm 69 of relay 67. The EED device is fired and the explosive force generated thereby acts to rotate the buckle release lever 12 to an unlocked position permitting detachment of the parachute straps from the wearer.

Because of the low resistance of the discharge circuit, which approximates one ohm, a current approaching 26 amperes is supplied to the EED during the firing portion of the operating cycle.

Diode 90 across the coil of relay 53 acts to delay the opening of the relay contacts after the capacitor voltage has fallen below the drop-out voltage rating of the relay. Capacitor 89 in the input circuit of Schmitt trigger 51 maintains transistor 50 "on" until capacitor 27 is completely discharged.

The operation of the checkout circuit 73 is as follows: First the two mating member of connector 70 are interconnected and then switch 76 is moved to its "on" position. Test light 83 will indicate the condition of the local battery 74 which has a nominal voltage of 5.6 volts. Relay 67 is now energized through contact arm 78 of switch 76. This arms the control circuit and connects the explosive device 66 in series with a current limiting resistor 71 connected to the base of transistor 72. Resistor 71 prevents any firing of the EED during the discharge cycle of capacitor 27.

If test switch 77 is now operated, an input voltage from battery 74 is applied via the lower contact arm 80 of this switch, contact arm 79 of switch 76 and diodes 84 and 85 to the Schmitt triggers 51 and 45. This simulates the closure of water sensors 23 and 29. Diodes 84 and 85 isolate the test circuits against connector ground faults. When these trigger circuits are activated, the control circuit duplicates the performance previously described which results in the charging of storage capacitor 27 and its subsequent discharge when the voltage across it reaches the Zener breakdown value previously mentioned.

If the control circuit is working properly, that is, if battery 20 has a satisfactory voltage level and if the other circuits, such as the various Schmitt triggers and the inverter are functioning, test light 75 will be illuminated when transistor 72 is turned "on" in response to the discharging of storage capacitor 27 through resistor 71. Resistor 88 is used to ensure transistor leakage current does not cause transistor 72 to turn-on at high temperatures. This resistor is not needed in most applications. When capacitor 27 is discharged, the input voltage to Schmitt trigger 51 falls below the threshold required to maintain it "on" and transistor 50 is turned "off". This causes relay 53 to de-energize and allows capacitor 27 to recharge to 26 volts, and the firing cycle is repeated. As long as the "Test" switch 77 is held closed, a "flashing" light will be provided. When the system is operating, relay 53 also provides an audible sound, i.e., relay pulling in and dropping out.

When switch 77 is returned to its normal position, the control circuit will cease operating. Any charge remaining on capacitor 27 will be discharged to ground through contact arm 68, resistor 82, and contact arm 77. If switch 76 is moved to an "off" position or if the two mating members of connector 70 are separated, relay 67 will be de-energized and the explosive device 66 will be connected to ground through contact arm 69 of this relay.

It would be pointed out that the EED 66 is a military standard 1 ohm, 1 watt device which requires 3.5 amperes for 50 milliseconds for firing. It will not fire with a continuous current of 1 ampere. Its thermal characteristics are such that the energy required for firing decreases as the voltage or current increases. For example, the energy required at 3.5 amps is typically 600 millijoules, whereas that required at 28 amps is 50 millijoules. To achieve this 28 amps, a voltage of 28 volts from a power source with high current capability is required. This voltage and high current cannot be provided with a conventional battery since there is the requirement that the complete control circuit including the battery be of miniaturized construction so that it can be attached to the parachute fitting 11 shown in FIG. 1. Thus the system resorts to capacitor 27 charged to 28 volts for providing this energy. If this capacitor is of 127 microfarads, when charged to 28 volts, it will supply approximately 50 millijoules of energy. To insure that sufficient energy is available to fire the EED at $-55°$ C. and after a 5 year shelf life, a capacitor rating of 500 microfarads is utilized. A tantalum capacitor of this rating is suitable for the present application since it can be contained in a volume of approximately 0.1 in$^3$.

It would also be pointed out that the DC-to-DC converter 55 which steps up the voltage from 5.6 to 56 volts can also be packaged in a volume of approximately 0.1 in$^3$, since the time required for energy transfer is approximately 1.5 seconds and the converter operates at a frequency in the range of 10 to 20 KHZ.

What is claimed is:

1. A control circuit for firing an electrical explosive device whose explosive force disengages a release lever of a parachute buckle from a parachute strap comprising in combination a pair of water sensors;
   a storage capacitor;
   means for charging said storage capacitor in response to the immersion of one of said sensors in sea water;
   an electrical explosive device; and
   means for discharging said storage capacitor through said electrical explosive device in response to the immersion of the other sensor in sea water and only when the voltage across said storage capacitor has a preselected magnitude,
   the discharge current of said storage capacitor being sufficient to fire said electrical explosive device.

2. Apparatus for releasing a parachute from the wearer thereof wherein an electrical explosive device provides the force for operating a release lever which disengages the parachute buckle from a parachute strap the combination of a pair of water sensors;
   a battery source of DC voltage;
   a DC-to-DC converter for increasing the DC battery voltage to a substantially higher level;
   means for connecting said DC voltage source to the input of said converter when one of said water sensors is activated by its immersion in a fluid medium having a particular conductivity;
   a storage capacitor connected to the output of said converter;
   an electrical explosive device; and
   means operative when the other of said water sensors is activated and the voltage across such storage capacitor reaches a predetermined value for connecting said electrical explosive device to said storage capacitor whereby said electrical explosive device is fired in response to the discharge of said storage capacitor and said release lever is operated.

3. In an arrangement as defined in claim 2
a check-out circuit adapted to be connected to said apparatus,
said check-out circuit providing a visual indication of the operability of the apparatus for charging and discharging said storage capacitor when both of said water sensors are activated.

4. Apparatus for automatically releasing a parachute from the wearer thereof which includes a release lever in the parachute buckle that is operated by the firing of an electric explosive device, comprising in combination
a pair of water sensors;
a storage capacitor;
means operative when one of said water sensors is activated by its immersion in sea water for charging said storage capacitor,
an electrical explosive device; and
means for discharging said storage capacitor through said electric explosive device when the other of said water sensors is activated by its immersion in sea water and the voltage across said storage capacitor has reached a predetermined value,
the discharge current firing said electric explosive device and operating said release lever.

5. In an arrangement as defined in claim 4 wherein said means for charging said storage capacitor includes
a battery;
means for converting the voltage available at said battery to a higher voltage; and
a solid-state switching means for connecting said higher voltage to said storage capacitor when said one of the water sensors is activated.

6. In an arrangement as defined in claim 4 wherein said electrical explosive device normally has both sides thereof grounded to protect it against accidental firing.

7. In an arrangement as defined in claim 6 wherein one side of said electrical explosive device is ungrounded and connected to said storage capacitor when the voltage thereacross reaches said predetermined value.

8. In an automatic parachute release arrangement of the type wherein a parachute buckle release mechanism is operated in response to the firing of an electrical explosive device, the combination of
a pair of water sensors,
said sensors including first, second, and third electrodes with said second electrode being common to said pair of sensors;
an electrical explosive device;
a storage capacitor;
means for charging said storage capacitor when a conducting path is present between said first and second electrodes; and
means for discharging said storage capacitor through said electrical explosive device when a conducting path is present between said second and third electrodes and the voltage across said storage capacitor has attained a predetermined magnitude,
the discharge of said capacitor through said electrical explosive device resulting in the firing of said device and the operation of said parachute buckle release mechanism.

9. In an arrangement as defined in claim 8 wherein a ground is normally applied to both sides of said electrical explosive device to prevent inadvertent firing thereof.

10. In an arrangement as defined in claim 9 wherein one of said sides is removed from ground and connected to said storage capacitor when the voltage across said storage capacitor has attained said predetermined magnitude.

* * * * *